(12) United States Patent
Josue et al.

(10) Patent No.: US 10,956,812 B1
(45) Date of Patent: Mar. 23, 2021

(54) NEUROMORPHIC ARCHITECTURE BASED SIGNAL DETECTION

(71) Applicants: Theodore Lee Josue, Oakwood, OH (US); Benjamin D. Ausdenmoore, Xenia, OH (US); Jeffrey Dustin Clark, Beavercreek, OH (US)

(72) Inventors: Theodore Lee Josue, Oakwood, OH (US); Benjamin D. Ausdenmoore, Xenia, OH (US); Jeffrey Dustin Clark, Beavercreek, OH (US)

(73) Assignee: Riverside Research Institute New, York, NY (US)

( * ) Notice: Subject to any disclaimer, the term of this patent is extended or adjusted under 35 U.S.C. 154(b) by 835 days.

(21) Appl. No.: 15/679,845

(22) Filed: Aug. 17, 2017

Related U.S. Application Data

(60) Provisional application No. 62/375,969, filed on Aug. 17, 2016.

(51) Int. Cl.
*G06N 3/063* (2006.01)
*G06F 16/33* (2019.01)
*G06N 3/02* (2006.01)

(52) U.S. Cl.
CPC ........... *G06N 3/063* (2013.01); *G06F 16/334* (2019.01); *G06N 3/02* (2013.01)

(58) Field of Classification Search
None
See application file for complete search history.

(56) References Cited

PUBLICATIONS

Kole, et al., Signal Processing in the Axon Initial Segment, Neuron, vol. 73, Issue 2, Jan. 26, 2012, pp. 235-247 (Year: 2012).*
Hunter, et al., Binary Imaging Analysis for Comprehensive Quantitative Histomorphometry of Peripheral Nerve, Journal of Neuroscience Methods, Jun. 29, 2007, 166(1), pp. 116-124 (Year: 2007).*

* cited by examiner

*Primary Examiner* — Wilbert L Starks
(74) *Attorney, Agent, or Firm* — Keith D. Nowak; Carter Ledyard & Milburn, LLP

(57) ABSTRACT

A method and system for performing real time searches of large alphanumeric data sets including the following steps, combining a cognitive neuromorphic architecture with a neuron based encoding binary filter, wherein building the filter includes encoding input data as a concatenated binary representation, wherein the data becomes a binary value, connecting an axon to a neuron to create a synapse; wherein each binary value includes multiple axons and neurons, determining a weight to each synapse, applying the synaptic weight to the input data to determine an integrated value and determining if the integrated value is greater than or equal to a threshold value.

8 Claims, 2 Drawing Sheets

| 0000 | 0000 | 0001 | 1001 | 0011 | 0111 | 0100 | 0010 | 0111 | 0111 | 0000 | 0000 | 0000 |
|---|---|---|---|---|---|---|---|---|---|---|---|---|
| 0 | 0 | 1 | 9 | 3 | 7 | 4 | 2 | 7 | 7 | 0 | 0 | 0 |
| Country Code | | | Area Code | | | Prefix | | | Number | | | |

| 0000 | 0000 | 0001 | 1001 | 0011 | 0111 | 0100 | 0010 | 0111 | 0111 | 0000 | 0000 | 0000 |
|---|---|---|---|---|---|---|---|---|---|---|---|---|
| 0 | 0 | 1 | 9 | 3 | 7 | 4 | 2 | 7 | 7 | 0 | 0 | 0 |
| Country Code ||| Area Code ||| Prefix ||| Number ||||

NEUROMORPHIC ARCHITECTURE BASED SIGNAL DETECTION

This application claims priority to U.S. Provisional Patent application No. 62/375,969 filed Aug. 17, 2016 entitled "Neuromorphic Architecture-based Signal Detection" and is hereby incorporated by reference in its entirety.

The present invention relates to a processing system, more specifically a method and system using neuromorphic computing hardware to perform massive real time searches.

BACKGROUND

The current state of the art computer processor architectures are based on the von Neumann model; instructions and data share a common bus and memory and therefore instruction fetch and data access cannot occur at the same time. Having a single bus only allows access to one of the two classes of memory at a time and therefore throughput is lower than the rate at which the CPU can work. This is referred to as the von Neumann bottleneck and can limit the performance of the system by significantly reducing the effective CPU processing speed. The CPU is constantly waiting for data to be transferred in or out of memory. Such architecture is inefficient and needlessly consumes significant amounts of time and power. The present invention differs from the current state of the art based on the way the neuron based classifiers are implemented, enabling pre-trained 100% accurate classification. The present invention exploits a characteristic of non-von Neumann hardware which enables the discrete encoding of binary classifiers without the inefficiency of forward and back propagation, whereas most, if not all, other solutions are focused on the implementation of convolutional neural networks to achieve similar accuracies.

SUMMARY OF THE INVENTION

The present invention provides the application of $3^{rd}$ generation spiking artificial neural networks (ANN) using a Cognitive Neuromorphic Architecture (CNA) utilizing a neuron-based encoding scheme to provide brain like processing speeds for the processing and exploitation of signals with reduced size, weight, and power (SWaP) requirements. The very low SWaP, massively parallel, and highly configurable design is revolutionary as it abandons the traditional Von Neumann model, yet is still easily integrated into such systems.

The present invention provides a method and a system that reduces power consumption, retains or improves processing speeds, increases the capability of small form factor devices and reduces the dependence on large scale systems to accomplish similar functionality. The method and system include the equivalent of fully trained spiking neural networks in a cognitive neuromorphic architecture that implements discrete binary filters to perform in excess of 1 billion comparisons over a second of cell phone metadata, for example, against known target data, while guaranteeing 100% accuracy.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION

Figures 1, 2:
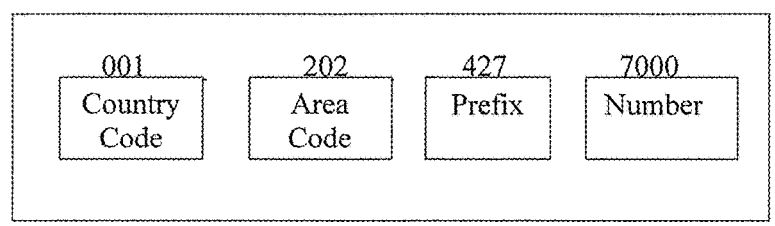
FIG. 1 shows an example of a 13 digit telephone number format.
FIG. 2 shows an example of binary encoding of a 13 digit telephone number.

A cognitive neuromorphic architecture is a computing framework that is inspired by the functioning of the human brain. It is estimated that the human brain contains an order of $10^{11}$, or 100 billion neurons and that each neuron may have as many as 100,000 connections with neurons, forming massively interconnected neural networks. Neurons send electrical impulses to other neurons via their axons, and they receive electrical impulses from other neurons via their dendrites. When an axon from one neuron connects to the dendrite of another neuron, the connection is called a synapse. This same terminology is used to describe the interconnections of artificial neurons in a CNA. CNAs can be used as building blocks for novel brain-inspired architectures that implement flexible, scalable, interconnected, configurable neural network that bring memory, processing, and communication into close proximity. These new CNA topologies will enable the design of computing systems that emulate the brain's computing efficiency, processing density, and power usage. "Neuron" in the present invention refers is based on neural networks that mimic the way the brain works, such as enabling learning and the ability to detect anomalies, identify similarities and practice "associative memory." This allows simultaneously storing and processing information in parallel and collaborating with one another through a bidirectional neural bus in contrast to the von Neumann state of the art. The neuromorphic branch of computing has existed since the 1980s, however the present invention uses this architecture in a novel way, with neuron based encoding.

Unlike current generation processors, which are constantly cycling, even when there is no data to process, CNAs are data driven and only cycle when there is data to process, which results in extreme power efficiency. CNAs also use massively parallel structure, which eliminates the von Neumann bottleneck by current generation processors.

The method and system presented perform massive, real time, parallel searches of alpha-numeric data, for example one billion search operations per second with 100% accuracy using a collection of just 1 million neurons for mobile device metadata. Such searches require orders of magnitude of less power than the traditional processing systems. The processing system is built upon a neuromorphic computing hardware. The key is the neuronal encoding of the binary filters, using one neuron to represent two discrete values. The present invention begins with a network that is essentially pre-trained to 100% accuracy, entirely bypassing the forward and back propagation steps.

Combining Cognitive Neuromorphic Architecture (CNA) with a neuron based encoding scheme provides a processing system that can perform massive real time searches. The CNA is capable of using a neuron based binary encoding scheme to perform search operations of alpha numeric data and filter numeric or text based sequences including cell phone metadata (International Mobile Subscriber Identity (IMSI)), Mobile Subscriber Integrated Services Digital Network Number (MSISDN), Integrated Circuit Card ID (IC-CID), and International Mobile Equipment Identity (IMEI) numbers, IP addresses, MAC addresses and telephone numbers from a continuous stream of source data. Throughput for various data examples using a neural network containing 1 million neurons are shown in Table 1,

TABLE 1

| Metadata | Digits | Bit Depth | Total filters | Throughput (search comparisons/sec) |
| --- | --- | --- | --- | --- |
| IMSI | 15 | 120 | 2,097,152 | 1,048,576,000 |
| MSISDN | 16 | 128 | 2,097,152 | 1,048,576,000 |
| ICCID | 19 | 152 | 1,048,576 | 1,048,576,000 |
| IMEI | 13 | 104 | 2,097,152 | 1,048,576,000 |

This includes the creation of a set of reusable filters that can achieve 100% accuracy for discrete binary-encoded alpha-numeric data.

The design of a functional CNA program of the present invention uses a neuron based encoding scheme to filter a numeric or text-based sequence out of a large database of text or numeric metadata values. The processing system uses actual signals, for example mobile device metadata, containing numeric or text based sequences embedded within a multiplexed signal of simulated benign, non-target signals in the same frequency range. Using a binary encoding scheme with discrete valued filters on an artificial neuron based architecture ensures 100% accuracy as the network is essentially pre-trained; the network does not need to converge toward the solution as the solution is already known. In order to build a filter for a phone number in the 13-digit format, it must first be encoded as a concatenated binary representation of each digit. For example, FIG. 1 shows a filter built for a 13-digit format phone number. As shown in FIG. 2, each digit of the 13 digit phone number has a value of 0-9, which requires four bits for binary encoding. As a result, the 13-digit phone number becomes a 52-digit binary value. To build a filter for this value, 52 inputs (axons) per neuron are used, which forms 52 synapses.

Each of the 52 synapses in the present example are assigned a weight of 1, 0 or −1, that corresponds to the desired value of the filter, 1 for a corresponding filter value of 1, and a weight of −1 for a filter value of 0. This has the effect of maximizing the summation of the neuronal inputs when the correct value is input. To ensure accuracy, the synaptic encoding is split into and upper and lower portions: the upper positively weighted, and the lower portion being the negatively weighted ones complement of the upper portion. The use of only two synaptic weights greatly decreases the complexity of the design, ensuring 100% accuracy for any alpha-numeric, binary encoded data source.

Because the CNA uses a neuron as the basic processing unit the required input must be in the form of a train of low-voltage spikes, and the output of the network is likewise a train of low-voltage spikes. Any data must therefore be converted into spikes prior to processing, a process known as transduction. Once the spike data is processed through the CNA, it must then be decoded back into the required data format for further processing or visualization. The very low SWaP, massively parallel structure, and highly configurable design is revolutionary as it abandons traditional Von Neumann designs through its use of CNAs, yet is still easily integrated into more complex systems.

Figure 3A:
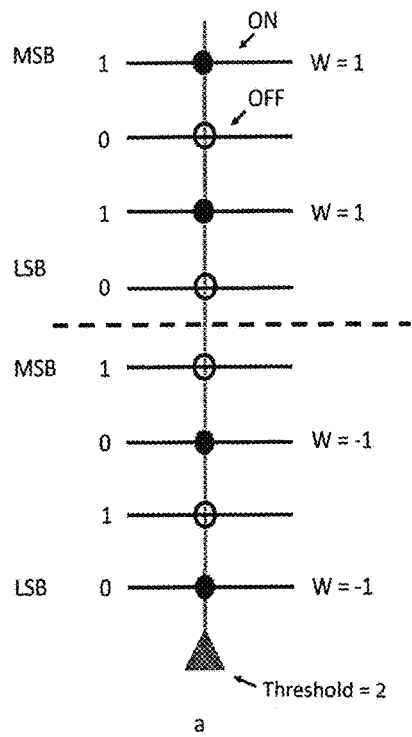
FIGS. 3a to 3c show 3 graphic examples of encoding in the present invention.
Figure 3B:
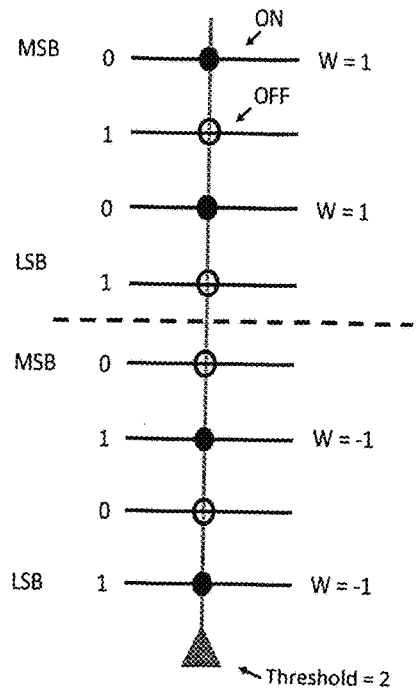
Figure 3C:
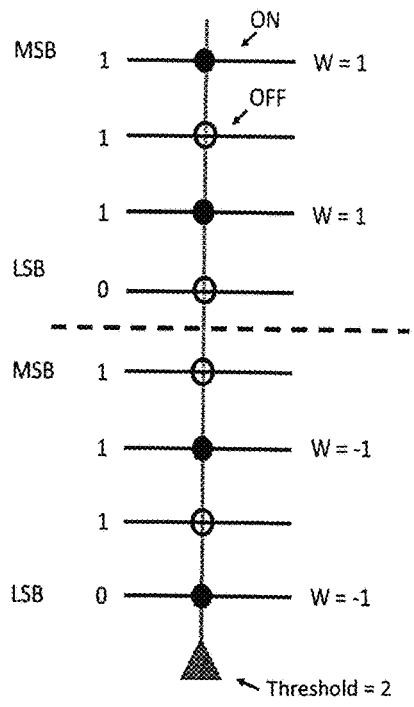

FIGS. 3a to 3c are examples of the present invention. The steps of the present invention include the following. The first step is to duplicate the input data stream. For example 1010, becomes 10101010. Next, the binary model encoded in the neuron encodes the normal value on the upper 4 bits and the ones complement value in the lower 4 bits. The threshold value of the neuron is set to the number of active synapses in the "upper" portion. In the examples below there are 2 active synapses and therefore the active threshold is 2. The synaptic weights of the upper portion are set to 1 and the weights of the lower portion are set to −1. The input is then applied to the neuron and the neuron integrates across the neuron. The input value $X_i$ is multiplied by the weight value $W_i$ and these values are summed across the neuron. If the integrated value is greater than or equal to the threshold value, the neuron fires, indicating a match. Because the ones complement is negatively weighted, a false value will decrease the integrated value and the neuron will not fire. The negative ones complement weighting creates a neuron that maximizes the output value only when the matching input value is received.

Example 1

FIG. 3a depicts the first example. A neuron is encoded for the value 1010. When 1010 is input, the integrated sum is maximized for the neuron. The output value of the neuron is 2, this is equal to the threshold value of 2. This causes the neuron to fire, indicating that the input value is a match. (MSB represents the Most Significant Bit and LSB represents the Least Significant Bit).

Example 2

FIG. 3b depicts example 2. This shows the same neuron of Example 1, however with a different input value of 0101. The integrated sum in this case is −2, which does not meet the threshold value of 2, and accordingly, the neuron does not fire, which indicates that there is not a match.

Example 3

FIG. 3c depicts example 3. Again, the same neuron of Example 1, encoded for the value 1010. The input however is 1110, without the one's complement encoding, this neuron would see a value of 2, which would cause the neuron to fire. However, because the lower half of the neuron is a negatively weighted one's compliment, this has an effect of dragging down the integrated value, and once again, the neuron will not fire due to an incorrect input value.

The structure of CNAs can vary. One example of a CNA may include a DARPA-Synapse, a neuro-synaptic core architecture and corelet programming. Each chip varies, one for example may contain one million individually programmable neurons, 256 million individually programmable synapses, 5.4 B transistors and over 4,000 parallel and distributed cores interconnects in and on a chip mesh network. The core includes a SRAM, a token control and a scheduler. The neuro-synaptic core architecture may include over 250 axons (inputs) and over 250 neurons (outputs). CNA processors can be built upon a 64×64 grid of neurosynaptic cores for example, and may use the leaky integrate-and-fire neuron model as the basic operating process unit. Multiple chips can be scaled together as a building block.

The present invention can be applied in many helpful systems including those with large data sets. Such systems include DNA indexing systems.

Although the present invention has been described in conjunction with specific embodiments, those of ordinary skill in the art will appreciate the modifications and variations that can be made without departing from the scope and the spirit of the present invention.

The invention claimed is:

1. A method of performing a real time search of large alphanumeric data sets, wherein the search requires less power than traditional processing systems, the method comprising the following steps:
   combining a cognitive neuromorphic architecture with a neuron based encoding binary filter, wherein building the filter includes:
   encoding an input data stream as a concatenated binary representation, wherein the input data stream becomes a binary value;
   duplicating the input data stream;
   connecting an axon to a neuron to create a synapse for each duplicated data stream;
   wherein each binary value includes multiple axons and neurons;
   using one neuron to represent two discrete integrated values;
   setting a threshold value of the neuron,
   determining a synaptic weight to each synapse;
   applying the synaptic weight to the input data to determine an integrated value; and
   determining if the integrated value is greater than or equal to a threshold value.

2. The method as recited in claim 1 wherein the synaptic weight given to each synapse is 1 for a corresponding value of 1 and negative 1 for the 0 valued inputs.

3. The method as recited in claim 1 wherein the encoding is split into an upper portion and a lower portion, wherein the upper portion is positively weighted and the lower portion is negatively weighted.

4. The method as recited in claim 1 further comprising firing the neuron if the integrated value is greater than or equal to the threshold value.

5. A method of performing a real time search of large alphanumeric data sets with 100% accuracy, wherein the search requires less power than traditional processing systems, the method comprising:
   combining a cognitive neuromorphic architecture with a neuron based encoding binary filter, wherein building the filter includes:
   duplicating an input data stream;
   encoding a binary model in a neuron, wherein the encoding is split into an upper portion and a lower portion;
   using one neuron to represent two discrete integrated values;
   setting a threshold value of the neuron, wherein the threshold is set to a number of active synapses in an upper portion;
   setting synaptic weights for the upper portion and a lower portion;
   multiplying an input value by the synaptic weight value and summing the totals across the neuron;
   firing the neuron if the integrated value is greater than or equal to the threshold value.

6. A computing system for real time searches of large alphanumeric datasets comprising;
   a Cognitive Neuromorphic Architecture (CNA),
   a neuron based binary encoding filter on the CNA;
   signals; and
   a bidirectional neural bus allowing simultaneous storing and processing of information.

7. The system as recited in claim 6 wherein the signals contain numeric or text base sequences embedded within a multiplexed signal of simulated benign, non-target signals in the same frequency range.

8. The system as recited in claim 6 wherein the filter is a discrete valued filter.

* * * * *